Figure 1:
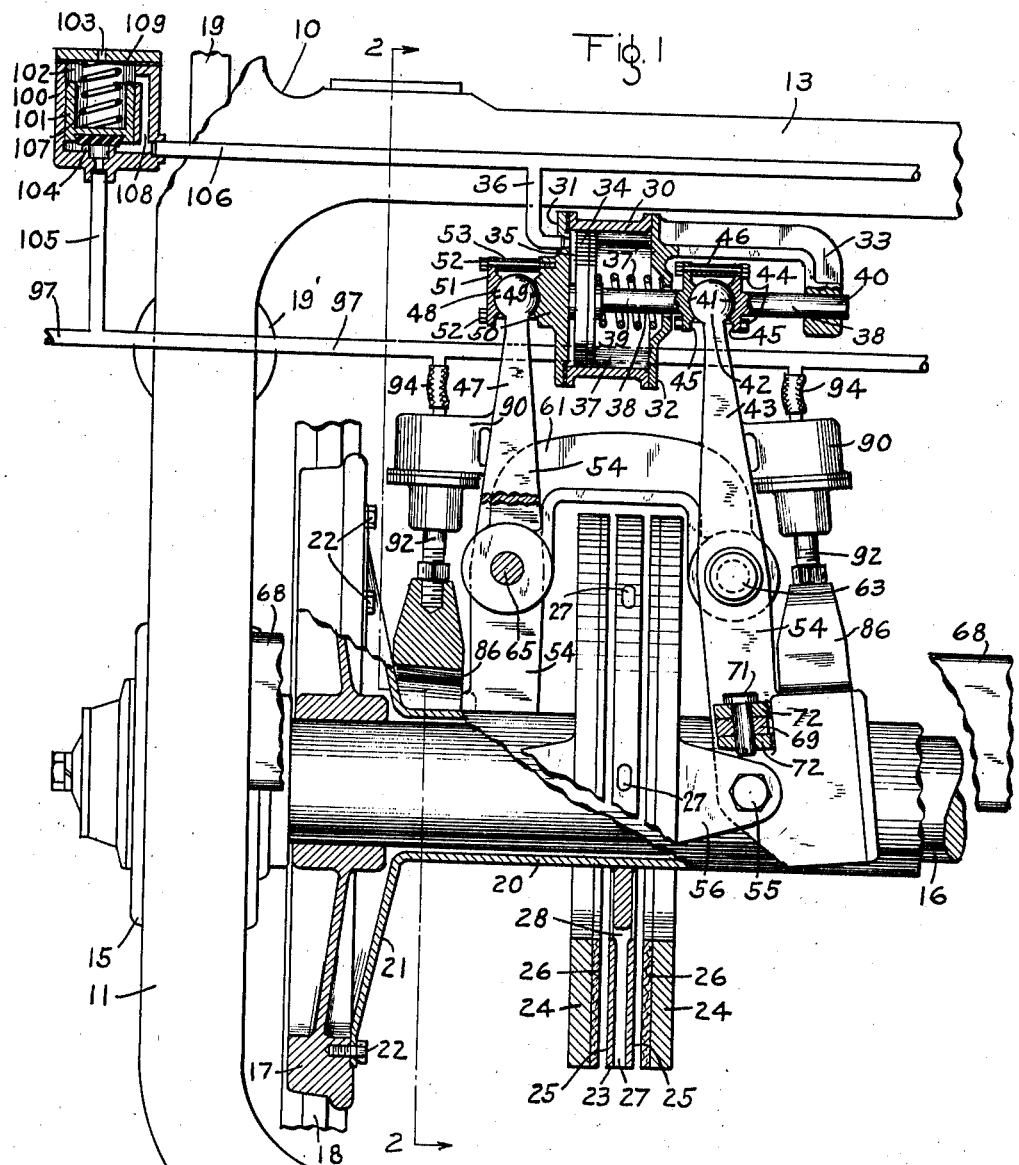

Sept. 26, 1939.  C. C. FARMER  2,174,402
DISK BRAKE DEVICE
Filed March 29, 1938   2 Sheets-Sheet 1

INVENTOR
CLYDE C. FARMER
BY
ATTORNEY

Sept. 26, 1939.                    C. C. FARMER                    2,174,402
                                 DISK BRAKE DEVICE
                              Filed March 29, 1938              2 Sheets-Sheet 2
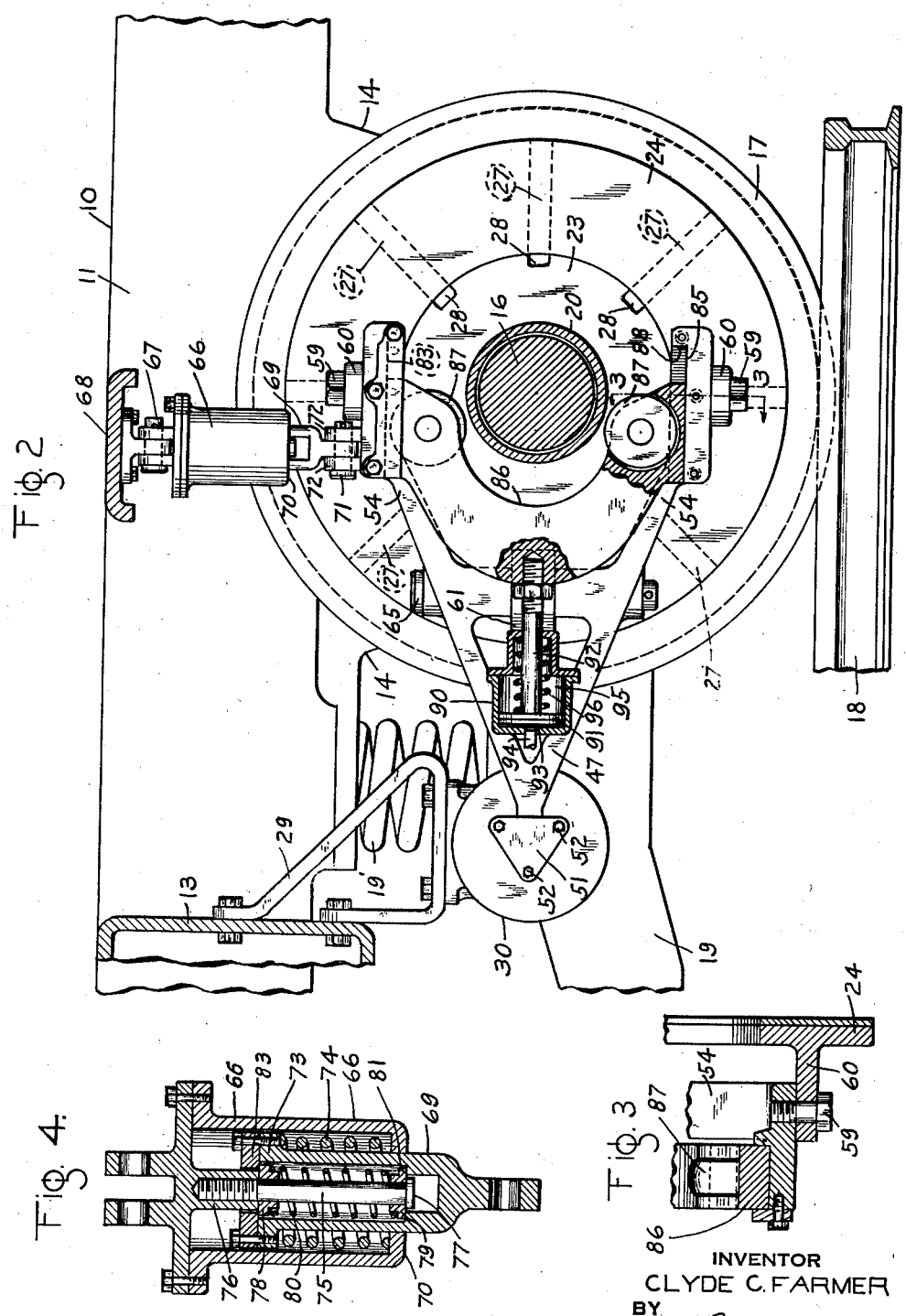
INVENTOR
CLYDE C. FARMER
BY
ATTORNEY Patented Sept. 26, 1939

2,174,402

UNITED STATES PATENT OFFICE 2,174,402

DISK BRAKE DEVICE

Clyde C. Farmer, Pittsburgh, Pa., assignor to The Westinghouse Air Brake Company, Wilmerding, Pa., a corporation of Pennsylvania Application March 29, 1938, Serial No. 198,640

31 Claims. (Cl. 188—59)

The invention relates to brake mechanisms for vehicles and more particularly to the friction disk type for use in braking the wheels of railway vehicle trucks.

Disk brake mechanisms embodying rotatable and non-rotatable friction disks and means for moving said disks into frictional braking engagement have heretofore been proposed for use on vehicle trucks for braking the wheels thereof. These mechanisms have usually been secured in one way or another to the axle or wheels of the vehicle truck thus increasing the dead or unsprung weight of the truck to a greater degree than usual, with the result that forces may be developed between the wheels and rails, as the wheels strike high spots in the rails such as at rail joints, which are liable to cause excessive wear and damage to the rails and wheels and to other parts of the vehicle carried by the wheels, which is undesirable.

One object of the present invention is to provide an improved disk brake mechanism for use particularly on railway vehicle trucks in which the major portion of the weight of the mechanism is carried by the truck frame, so as to thereby reduce to a negligible degree the weight of the mechanism carried by the wheels as unsprung weight.

Another object of the invention is to provide an improved disk brake mechanism for a wheel and axle assembly of a vehicle truck in whcih the axle is neither subjected to any portion of the weight of the mechanism or to braking torque developed therein at the time an application of the brakes is effected, thereby obviating the possibility of axle breakage or loosening of the axle in the wheels.

According to these objects the non-rotatable braking elements and the means for controlling their operation are carried by the truck frame, while encircling the axle in concentric relation therewith and secured at its opposite ends to the wheels of the wheel and axle assembly is a rigid tube provided for carrying the rotatable elements of the mechanism, said tube and rotatable elements being the only parts of the mechanism carried by the wheels as unsprung weight. Adjacent each of the wheels this tube is provided with an outwardly flaring frusto-conical shaped portion the outer periphery of which is secured to the wheels near their peripheries so that braking torque applied to the tube upon operation of the brake mechanism is adapted to be transferred and applied to the wheels adjacent their peripheries through, in effect, relatively long torque arms.

The frame of a vehicle truck is usually resiliently carried on springs supported in one manner or another from the wheels, and said frame will therefore assume different elevated positions with respect to the wheels depending upon the degree of load carried by the vehicle body supported on the truck or due to vibration of the truck frame. It will therefore be apparent that since the non-rotatable elements of my approved disk brake mechanism are carried by the truck frame said elements will at different times assume different positions eccentric to the rotatable elements which are secured to the vehicle truck wheels. It is however desirable that the non-rotatable elements be in concentric relationship with the rotatable elements at the time the brakes on the truck are applied and another object of the invention is therefore to provide improved means for moving the non-rotatable elements relative to the truck frame and rotatable elements into concentric relationship with said rotatable elements at the time an application of the brakes is effected, and a still further object of the invention is to provide means adapted to prevent movement of the non-rotatable elements into frictional braking engagement with the rotatable elements until after said concentric relationship is obtained.

Other objects and advantages will be apparent from the following more detailed description of the invention.

Figure 5:
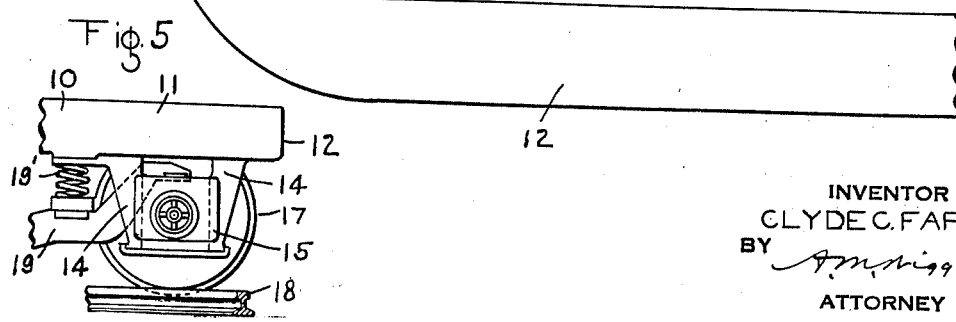

In the accompanying drawings, Fig. 1 is a plan view, partly in section, of a portion of one end and side of a vehicle truck embodying the invention; Fig. 2 is a sectional view taken on the line 2—2 in Fig. 1; Fig. 3 is a sectional view taken on the line 3—3 in Fig. 2; Fig. 4 is an enlarged, sectional view of an element shown in elevation in Fig. 2; and Fig. 5 is a side view of a portion of a vehicle truck with which the invention is associated.

As shown in the drawings the improved brake mechanism is applied to a vehicle truck which for the purpose of illustration comprises a truck frame 10 having spaced side members 11 connected together by the usual transversely extending end members 12 and transoms 13.

The side members 11 are provided with the usual spaced pedestals 14 slidably mounted on journal boxes 15 in which the ends of an axle 16 are journaled. A pair of oppositely disposed wheels 17 are rigidly secured to axle 16 in any desired manner and in the usual spaced relation for rolling on track rails 18. An equalizer bar 19 is provided at each of the opposite sides of the truck frame and is carried by the journal boxes 15, and said bars carry springs 19' upon which the frame 10 is resiliently supported.

Only a portion of one end and one side of a vehicle truck are shown in the drawings and therefore only one or a portion of certain of the elements above described are shown. The showing is however deemed sufficient to a clear understanding of the invention.

According to the invention there is provided between the wheels 17 and encircling the axle 16 a rigid tube 20. This tube is preferably spaced from axle 16 and is in concentric relation with the wheels 17 and is provided at each of its opposite ends with an outwardly flaring frusto-conical shaped portion 21 the outer peripheral portion of which is secured by bolts 22 to the inner periphery portion of the adjacent wheel 17. The tube 20 and the end portions 21 thereof which are secured to wheels 17 form a rigid structure through which braking forces are adapted to be transmitted to said wheels as will hereinafter be described.

A disk braking mechanism is provided adjacent the inner face of each of the wheels 17. Both of these mechanisms are identical in structure, but only one has been shown in the drawings for the purpose of illustrating the invention.

The disk brake mechanism shown in the drawings comprises an annular, rotatable, friction brake element 23 interposed between two annular non-rotatable friction braking elements 24, all of said elements encircling the tube 20. The rotatable element 23 is secured to tube 20 in concentric relation therewith and with the wheels 17, in any desired manner such as by welding, and is provided with oppositely disposed braking faces 25. The non-rotatable elements 24 are provided with a central opening to permit movement in a vertical direction relative to the tube 20 and, if desired, each may be faced with friction material 26 for frictional engagement with the adjacent face 25 of the rotatable element 23. The friction material 26 may be metallic, fibre or any other desired braking material.

The rotatable brake element 23 is provided with a plurality of spaced, radial passages 27 extending inwardly from the peripheral face of the element between the braking faces 25 and connected at their inner ends to cross-passages 28 provided through a portion of said element between said faces and the tube 20. These passages are provided to permit flow of air between the braking faces 25 upon rotation of the rotatable element in order to dissipate heat from said element incident to braking, which will be later described.

A brake cylinder device 30 arranged to work in a direction transversely of the truck is disposed at one side of the tube 20 at substantially the same level as said tube and is rigidly secured to any suitable part of the truck frame 10. In the drawings the brake cylinder device 30 is shown mounted on a bracket 29 which is secured to the transom 13.

The brake cylinder device 30 comprises a casing having secured to one end a pressure head 31 and to the opposite end a non-pressure head 32 from which there projects a rigid bracket 33 having at its outer end an inturned portion provided with a bore in axial alignment with the brake cylinder device.

The brake cylinder device 30 contains a piston 34 having at one face a pressure chamber 35 connected to a pipe 36 through which fluid under pressure is adapted to be supplied to and released from said chamber for effecting an application and a release of the brakes, as will hereinafter be described.

The brake cylinder piston 34 has at the opposite side a chamber 37 open to the atmosphere in any desired manner, and containing a release spring 37' which acts on said piston for urging it to its release position as shown in the drawings.

The piston 34 is provided with a rod 38 extending through the chamber 37 and a suitable bore in the non-pressure head 32 and through the bore in the end of the bracket 33, said bracket being provided to rigidly support the outer end of said rod. The inner end of the rod 38 is supported by piston 34 as will be evident.

The piston rod 38 is formed in two parts 39 and 40, the adjacent ends of which are provided with spaced concave, arcuate surfaces 41 between which the ball end 42 of a brake lever 43 is disposed to operate. The two parts 39 and 40 of the piston rod 38 are rigidly secured together by a plurality of spaced bolts 44 provided through flanges 45 on the two parts of the rod. A sleeve 46 is provided on each of the bolts 45 between and for engagement with the flanges 45 to provide a rigid connection between said flanges and also to provide sufficient clearance between the arcuate surfaces 41 after tightening of said bolts to permit free rocking movement of the ball end 42 of lever 43 between said surfaces. It will be evident that by this structure the two parts 39 and 40 of the piston rod 30 are rigidly secured together and provide a socket for pivotal movement of the brake lever 43.

A brake lever 47 is provided with a ball like end 48 pivotally disposed between and in engagement with oppositely formed arcuate surfaces 49 provided on a raised portion 50 of the brake cylinder pressure head 31 and a plate 51 rigidly secured to said raised portion by bolts 52, sleeves 53 being provided on said bolts between said plate and raised portion for properly spacing the arcuate surfaces 49 so that said lever is free to rock between said surfaces.

The levers 43 and 47 are substantially the same in structure, but oppositely disposed, and each is provided with two spaced legs 54 diverging from the ball ends of the levers and terminating opposite each other substantially above and below the tube 20. The ends of legs 54 of the lever 43 are disposed adjacent the inner non-rotatable element 24 and are pivotally connected to a pair of diametrically opposite outstanding ears 56 provided on the said element by substantially vertically disposed bolts 55, while the ends of legs 54 of lever 47 are pivotally connected by substantially vertically disposed bolts 59 to a like pair of diametrically opposite, outstanding ears 60 provided on the other non-rotatable element 24.

The levers 43 and 47 are pivotally connected together by a tie link 61 one end of which is connected to the lever 43 by a pin 63, while the other end is connected to lever 47 by a pin 65. It will be noted that the pivotal connection between the link 61 and levers 43 and 47 is closer to the tube 20 than the peripheral surfaces of the rotatable element 23 and non-rotatable elements 24 and said link is therefore made substantially U-shaped in order to bridge said elements.

A spring supporting device 66 pivotally connected through the medium of a pin 67 to any suitable part of the truck frame 10, such as a cross member 68 extending between and secured at its opposite ends to the side frames 11, is provided for resiliently supporting from the truck frame each of the non-rotatable elements 23 and the adjacent connected portion of the levers 43 and 47.

Each of the spring supporting devices comprises a casing pivotally carried by the pin 67 and containing a plunger 69 projecting through the lower end 70 of said casing and pivotally connected by a pin 71 to a pair of spaced ears 72 provided on the upper leg 54 of the adjacent lever 43 or 47. Each of the plungers 69 is provided in the casing with an enlarged head portion 73 between which and the lower end 70 of the casing is interposed a spring 74 acting upwardly on said plunger with a force sufficient to counterbalance the weight of the connected non-rotatable element 23 and the adjacent portion of the connected brake lever and other parts of the mechanism to be later described.

Each of the plungers 69 is provided with an axial bore in which there is disposed a pin 75 the upper end of which is secured in a boss 76 depending from the casing, while the lower end of said pin is provided with a head 77 disposed to slide in said bore.

A pair of oppositely disposed spring seats 78 and 79 are slidably mounted on each of the pins 75 between the head 77 of the pin and the depending boss 76, and disposed between said seats on each pin and encircling said pin is a coil spring 80.

In each of the devices 66 a shoulder 81 is provided adjacent the bottom of the bore in plungers 69 adapted to be normally engaged by the spring seat 79, while the spring seat 78 is adapted to normally engage the end of the boss 76 under which condition the spring 80 in each device is confined as will be evident.

The springs 80 are provided to dampen vibration or oscillation of the parts of the brake mechanism supported by the devices 66. For instance, if due to roughness of the track rails 18 upon which the wheels 17 roll or for any other reason, the parts of the brake mechanism carried by the spring devices 66 tend to move upwardly relative to the truck frame 10, the plunger 69 in each of said devices is urged upwardly and this movement relative to the pin 75 therein acts to pick up the spring seat 79 and compress the spring 80 so as to provide additional resistance to such upward movement. The springs 80 are however secured between the spring seats 78 and 79 under a certain predetermined pressure which it is intended will immediately dampen any upward movement of plungers 69 and parts of the brake mechanism carried thereby and then promptly return said plungers and parts to their normal position. The springs 80 are adapted to act in the same manner as just described in case the parts of the brake mechanism carried by the device 66 tend to move downwardly relative to the truck frame 10. In case of downward movement the head 77 of the pin 75 in each of the devices 66 holds the spring seat 79 against movement and a plate 83 secured to the upper end of the plunger 69 in said device provides a shoulder for moving the spring seat 78 downwardly against the resistance of spring 80, whereby, as above described, the several springs 80 act to dampen such movement and return the parts of the mechanism carried by the devices 66 to their normal position as shown.

From the above description it will be noted that the ball ends of the brake levers 43 and 47 are supported through the medium of the brake cylinder device 30 by the truck frame 10 and are therefore adapted to move with said frame, while through the medium of the spring supporting devices 66 the opposite ends of said levers and the connected non-rotatable elements 24 are also adapted to be moved with the truck frame and therefore relative to the tube 20 and wheels 17, as the frame moves due to vibration or assumes different vertical positions with respect to the wheels 17, due to different degrees of load which may, at different times, be carried by the truck. It will therefore be evident that the non-rotatable elements 24 will at different times or under different conditions assume various positions eccentric to the rotatable element 23.

Adjacent the ends of the legs 54 of each of the levers 43 and 47 there is provided a pair of oppositely disposed parallel and substantially horizontal slots or guides 85, and in these guides in each lever is slidably mounted a substantially semi-circular yoke 86. Each of these yokes 86 is provided at each of its opposite ends with a roller 87 adapted to engage the tube 20; the two rollers in each yoke being spaced apart a distance substantially equal to the diameter of said tube.

When the brakes on the truck are released each of the yokes 86 and their rollers 87 assume the position in which they are shown in Fig. 2 of the drawings, and in this position it will be noted that said rollers are spaced a sufficient distance from tube 20 to permit a certain vertical movement of the non-rotatable elements 24 with the truck frame, and therefore relative to the rotatable element 23.

The yokes 86 and rollers 87 are however adapted to be moved from the position shown in the drawings, at the time an application of the brakes is effected which will be hereinafter described, to a position in which said rollers in each yoke substantially engage diametrically opposite top and bottom portions of the tube 20, movement of the yokes being stopped in this position by engagement of said yokes with stops 88 provided at the end of the guides 85 in each brake lever. The parts of the mechanism are so arranged that in this position of yokes 86 the non-rotatable elements 24 will be positioned, through the medium of the connection with the levers 43 and 47 and yokes 46, in concentric relation with the rotatable element 23.

In order to move the yokes 86 to their different positions there is associated with each of the brake levers 43 and 47 a fluid pressure operated centralizing cylinder device 90. Each of these cylinder devices comprises a casing containing a piston 91 which is provided with a piston rod 92 extending through the end of the casing and adjustably connected to the adjacent yoke 86.

Each of the pistons 91 has at one side a pressure chamber 93 connected to a pipe 94 through which fluid under pressure is adapted to be supplied to and released from said chamber, while at the opposite side of each of said pistons there is provided a chamber 95 which is open to the atmosphere in any desired manner. A spring 96 is provided in each chamber 95 with one end acting on the end of the casing and the other end acting on the piston 91 for moving said piston and the connected yoke 86 to their usual release position, as shown in the drawings.

The pipes 94 from the several centralizing cylinder devices 90 are preferably connected in parallel to a pipe 97 which extends to the brake mechanism adjacent both wheels of the wheel and axle assembly. Fluid under pressure is adapted to be supplied to the pipe 97 in effecting an application of the brakes and released from said pipe in effecting a release of the brakes in any desired manner, such as by the conventional type of triple valve device (not shown) used on railway vehicles.

When the brakes are released and fluid under pressure is therefore vented from pipe 97, pipes 94, and the connected piston chambers 93 in the centralizing cylinder devices 90, the springs 96 in said devices act to position the pistons 91 and the several yokes 86 in the position shown in the drawings, in which position the yokes are drawn away from the tube 20 a sufficient distance to permit movement of the non-rotatable elements 24 with the truck frame 10 through the medium of the spring supporting devices 66 as above described.

When fluid under pressure is supplied to pipe 97 at the time an application of the brakes is effected, fluid under pressure flows from said pipe to the pipes 94 and from thence to chamber 93 in the several centralizing cylinder devices 90 and therein acts on the pistons 91 to move the yokes 86 in the direction toward the tube 20. As the yokes 86 are thus operated, one or the other of the rollers 87 in each yoke engages the tube 20, according to whether the axis of the non-rotatable elements 24, as positioned by the spring supporting devices 66, is above or below that of the non-rotatable elements 23. When this condition is obtained, the pressure of fluid acting on the pistons 91 forces the rollers 87 first engaging the tube 20 to roll along the periphery of the tube and thereby raise or lower the yokes 86, as required, to permit the yokes to move into engagement with the stops 88. This raising or lowering of the yokes 86 acts through the connection with the non-rotatable elements 24 to shift said elements relative to the rotatable element 23, from whatever eccentric position the non-rotatable elements may have initially occupied, into concentric relation with said rotatable element.

It will be noted that this operation of the yokes 86 to move the non-rotatable elements 24 into concentric relation with the rotatable element 23 is opposed by either one or both of the springs 74 and 80 in the spring supporting devices 66, but this is immaterial since the only function of said springs is to support the non-rotatable elements and dampen oscillation thereof as heretofore described.

It will however be noted that regardless of the vertical position of the non-rotatable elements with respect to the rotatable elements at the time an application of the brakes is initiated, the operation of the yokes 86 will centralize the non-rotatable elements with the rotatable element.

At the time an application of the brakes is effected it is desired to move the non-rotatable elements 24 into concentric relation with the rotatable element 23 before said elements are moved into frictional braking engagement. In order to accomplish this any desired means or mechanism may be provided, but for the purpose of illustration I employ a delay valve device 100 which may comprise a casing containing a movable valve piston 101 having at one side a chamber 102 open to the atmosphere through a passage 103; a seat rib 104 being provided for engagement with the opposite face of said valve piston.

The space within seat rib 104, which is annular in form, is connected to a pipe 105 leading to pipe 97, while the annular space outside of said seat rib is connected to a pipe 106 to which in turn is connected pipe 36 leading to the brake cylinder device 30.

A spring 107 is provided in chamber 102 acting on the valve piston 101 for normally holding said valve piston in engagement with seat rib 104 in which position the pipe 106 is connected through a passage 108 to chamber 102 and thence to the atmosphere through passage 103. Through the communication just described the pressure chamber 35 at the left hand face of the brake cylinder piston 34 is normally open to the atmosphere which permits the release spring 37' acting on the brake cylinder piston 34 to hold said piston in its normal release position, as shown in the drawings.

With the brake cylinder piston 35 in its release position, the connected end of the brake lever 43 is so positioned with respect to the ball end 48 of the brake lever 47 that, through the medium of the connecting link 61, the opposite ends of said levers are spaced apart sufficiently that the connected non-rotatable elements 24 are spaced from and therefore out of engagement with the rotatable element 23 under which conditions the brakes on the truck are released.

When an application of the brakes is effected, fluid under pressure is supplied to pipe 97 for operating the centralizing cylinder devices 90 and from said pipe flows to pipe 105 and from thence to the delay valve device 100 wherein said pressure acts on the area of the valve piston 101 within the seat rib 104. The pressure of spring 107 acting on the valve piston 101 is sufficient however to maintain said valve piston seated against the seat rib 104 until after sufficient fluid pressure has been obtained in the centralizing cylinder devices 90 to operate the yokes 86 to move the non-rotatable elements 24 into concentric relation with the rotatable element 23. A slight increase in the pressure in pipe 105 acting on the valve piston 101 is then adapted to overcome the pressure of spring 107 and move said valve piston away from the seat rib 104 and into sealing engagement with a gasket 109. This movement of valve piston 101 closes communication between passage 108 and the vented chamber 102 and opens communication between pipe 105 and pipe 106 through which pipes fluid under pressure is then supplied to pipe 36 and from thence to chamber 35 in the brake cylinder device 30.

The pressure of fluid thus obtained in chamber 35 and acting on the brake cylinder piston 34 moves said piston towards the right hand against the opposing pressure of the release spring 37' and this movement acts through the piston rod 38 to move the connected end of the brake lever 43 in a direction away from the ball end 48 of the brake lever 47.

As the ends of the brake levers 43 and 47 connected to the brake cylinder device 30 are thus moved apart, the opposite ends of said levers are caused to move in a direction toward each other due to the connecting link 61, and thus acts to move the non-rotatable elements 24 in a direction toward and into frictional engagement with the opposite faces 25 of the non-rotatable element 23. Due to this frictional engagement the non-rotatable element 23 is braked and this braking action is transmitted to the tube 20 and from thence through the end portions 21 of said tube to the wheels 17 and acts to stop or retard rotation of said wheels. The degree with which the wheels 17 are thus braked may be varied by varying, in the usual well known manner, the pressure of fluid supplied to pipe 97 and from thence to the brake cylinder piston chamber 35 for acting on the piston 34 and for thereby forcing the non-rotatable elements 24 against the rotatable element 23.

When the non-rotatable elements 24 are forced into frictional engagement with the rotatable element 23 it will be noted that said non-rotatable elements are held against rotation with the rotatable element by the brake levers 43 and 47. The brake levers 43 and 47 therefore act not only as force transmitting members for moving the non-rotatable elements 24 into frictional braking engagement with the rotatable element 23 but also act as torque arms to hold the non-rotatable elements against turning, and it should also be noted that said levers also perform the function of carrying the centralizing yokes 86 and cylinder devices 90.

When it is desired to effect a release of the brakes after an application fluid under pressure is vented from pipe 97 and thereby from the several centralizing cylinder devices 90 which permits springs 96 in said devices to move the yokes 86 out of engagement with the tube 20 and back to their release position as shown in their drawings. As the yokes 86 are thus returned to their release position, the spring supporting devices 66 act to return the non-rotatable elements 24 and thereby said yokes to their normal position with respect to the truck frame 10.

When fluid under pressure is released from the pipe 97 in effecting a release of the brakes, fluid under pressure is also released from the brake cylinder piston chamber 35 by way of pipes 36, 106 and 105 and from thence to pipe 97, as a result of which the return spring 37' in the brake cylinder device 30 acts to move the brake cylinder piston 34 back to the release position as shown in the drawings. During this movement of the brake cylinder piston 34 the connected piston rod 38 acts to draw the adjacent end of that brake lever 43 toward the ball end of the lever 47. This forces the opposite ends of levers 43 and 47 and the connected non-rotatable elements 24 away from each other and thereby out of frictional engagement with the rotatable element 23 thereby relieving said rotatable element of braking force.

When in effecting a release of fluid under pressure from pipes 97 and 105, as above described, the pressure acting on the lower face of the valve piston 101 is reduced sufficiently, the spring 107 moves said piston out of engagement with gasket 109 and into engagement with seat rib 104 as shown in the drawings. This movement of the valve piston 101 closes communication between pipes 106 and 105 through which fluid under pressure is initially released from the brake cylinder device 30, as above described, however, it also opens communication between passage 108 and chamber 102 so that any fluid pressure remaining in the brake cylinder piston chamber 35 at the time the valve piston 101 moves to the position shown in the drawings, is released by way of the passage 108, chamber 102 and through the atmospheric passage 103.

It will now be noted that only the rotatable elements 23 and tube 20 of my improved brake mechanism are carried directly by wheels 17, all other parts of said mechanism being carried by the spring supported truck frame due to which the non-rotatable elements will move relative to and assume various positions eccentric to the rotatable elements. However, means are provided for moving the non-rotatable elements into concentric relationship with the rotatable elements at the time an application of the brakes is initiated, and the movement of the non-rotatable elements into braking engagement with the rotatable elements is delayed until after such relationship is obtained.

It will also be noted that by the use of tube 20, the axle 16 is not subject to any part of the weight of the mechanism or to braking forces developed therein at the time the brakes are applied and since the end portions of the tube are connected to the wheels 17 adjacent their peripheries a strong rigid construction is provided for transmitting braking forces to said wheels.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A brake mechanism for a vehicle truck having a pair of oppositely disposed spaced wheels, said mechanism comprising a supporting structure disposed between and rigidly secured to said wheels adjacent the peripheries thereof for rotation with said wheels, an annular rotatable friction braking element encircling and secured to said structure in concentric relationship with said wheels and rotatable therewith, an annular non-rotatable friction braking element encircling said structure, means for supporting said non-rotatable element in braking relationship with said rotatable element, and means for urging said non-rotatable element into frictional braking engagement with said rotatable element.

2. A brake mechanism for a vehicle truck having a pair of oppositely disposed spaced wheels, said mechanism comprising a tube disposed between said wheel in concentric relationship therewith and having outwardly flared ends rigidly secured to the inner faces of said wheels adjacent the peripheries thereof, an annular rotatable friction braking element encircling and secured to said tube in concentric relationship therewith for rotation with said wheels, an annular non-rotatable friction braking element encircling said tube, means for supporting said non-rotatable element in braking relationship with said rotatable element, and means for urging said non-rotatable element into frictional braking engagement with said rotatable element.

3. A brake mechanism for a wheel and axle assembly of a vehicle truck comprising a tube encircling said axle and having at each of its opposite ends an outwardly flaring frusto-conical shaped portion the outer peripheral portion of which is rigidly secured to the adjacent wheel of said assembly adjacent the periphery of the wheel, an annular rotatable friction braking element encircling and secured to said tube in concentric relationship therewith and adapted to rotate with said wheels, an annular non-rotatable friction braking element encircling said tube, means for supporting said non-rotatable element in braking relationship with said rotatable element, and means for urging said non-rotatable element into frictional braking engagement with said rotatable element.

4. A brake mechanism for a vehicle truck having wheels and a frame resiliently supported upon said wheels, said mechanism comprising an annular rotatable friction braking element secured to one of said wheels for rotation therewith, an annular non-rotatable friction braking element, a brake cylinder device operative by fluid under pressure for moving said non-rotatable element into frictional braking engagement with said rotatable element, resilient means carried by said frame for supporting said non-rotatable element, and fluid pressure controlled means connected to said non-rotatable element and operative to effect movement thereof relative to said frame and rotatable element into concentric relationship with said rotatable element.

5. A brake mechanism for a vehicle truck having wheels and a frame resiliently supported upon said wheels, said mechanism comprising an annular rotatable friction braking element secured to one of said wheels for rotation therewith, an annular non-rotatable friction braking element, adjustable means carried by said frame for supporting said non-rotatable element for movement with said frame, centering means for moving said non-rotatable element relative to said frame into concentric braking relationship with said rotatable element, actuating means for effecting frictional braking engagement between said elements for braking said wheels, and means for delaying the braking operation of said actuating means until after the operation of said centering means to centralize said non-rotatable element with said rotatable element.

6. A brake mechanism for a vehicle truck having wheels and a frame resiliently supported upon said wheels, said mechanism comprising an annular rotatable friction braking element secured to one of said wheels for rotation therewith, an annular non-rotatable friction braking element, a brake cylinder device operative by fluid under pressure for moving said non-rotatable element into frictional braking engagement with said rotatable element, resilient means carried by said frame for supporting said non-rotatable element, fluid pressure controlled means connected to said non-rotatable element and operative to effect movement thereof relative to said frame and rotatable element into concentric relationship with said rotatable element, and means operative to delay the supply of fluid under pressure to the brake cylinder device until after the operation of said fluid pressure controlled means.

7. A brake mechanism for a vehicle truck having wheels and a frame resiliently carried by said wheels, said mechanism comprising a circular element associated concentrically with one of said wheels and adapted to rotate therewith, an annular rotatable friction braking element secured concentrically to said circular element for rotation therewith, an annular non-rotatable friction braking element, a fluid pressure controlled brake cylinder device operative to move said non-rotatable element into frictional engagement with said rotatable element for braking said wheel, resilient means carried by said frame for supporting said non-rotatable element, means associated with said non-rotatable element and adapted to move into substantial engagement with said circular element at two radially located spaced points of said circular element for shifting said non-rotatable element into substantial concentric relationship with said rotatable element, and a separate fluid pressure operated cylinder device for controlling movement of said means.

8. A brake mechanism for a vehicle truck having wheels and a truck frame resiliently carried by said wheels, said mechanism comprising rotatable and non-rotatable annular friction braking elements adapted to frictionally engage for braking one of said wheels, means carried by said frame for supporting said non-rotatable element, and operative to permit movement thereof relative to said frame in a substantially vertical direction, a member secured axially to said wheel, centralizing means associated with the non-rotatable element adapted to be moved relative to the element to engage said member and then movable relative to said member to move said non-rotatable element into concentric braking relationship with said rotatable element and means for controlling movement of said centralizing means.

9. A brake mechanism for a vehicle truck having wheels and a truck frame resiliently carried by said wheels, said mechanism comprising rotatable and non-rotatable annular friction braking elements arranged to frictionally interengage for braking one of said wheels, means independent of said axle securing said rotatable element to said wheel for rotation therewith, means carried by said frame for supporting said non-rotatable element and operative to permit movement thereof relative to said frame in a substantially vertical direction, a member secured axially to said wheel, and a relatively movable centralizing member associated with said non-rotatable element adapted to engage said axial member and operative upon engagement with either an upper or lower portion thereof to centralize said non-rotatable element with respect to said rotatable element, and means for controlling movement of said centralizing member into and out of engagement with said axial member.

10. A brake mechanism for a vehicle truck having wheels and a truck frame resiliently carried by said wheels, said mechanism comprising rotatable and non-rotatable annular friction braking elements arranged to frictionally interengage for braking one of said wheels, said rotatable element being secured to said wheel for rotation therewith, means carried by said frame for supporting said non-rotatable element, and operative to permit movement of said non-rotatable element relative to said frame in a substantially vertical direction, an annular element secured in concentric relationship with one of said wheels, a member adapted to be moved relative to said non-rotatable element in a substantially horizontal direction into and out of engagement with said annular element and operatively connected to said non-rotatable element and adapted when engaging a portion of said annular element included substantially in a plane extending through the axes of said annular element and non-rotatable element to centralize said non-rotatable element with said rotatable element, and means for moving said member into and out of engagement with said portion of said annular element.

11. A brake mechanism for a vehicle truck having wheels and a truck frame resiliently carried by said wheels, said mechanism comprising rotatable and non-rotatable annular friction braking elements arranged to frictionally interengage for braking one of said wheels, said rotatable element being secured to said wheel for rotation therewith, means carried by said frame for supporting said non-rotatable element and operative to permit movement of said non-rotatable element relative to said frame in a substantially vertical direction, an annular element secured to one of said wheels in concentric relationship therewith, a member operatively connected to said non-rotatable element and adapted to move relatively thereto in a substantially horizontal plane, centering means carried by said member adapted to engage the periphery of said annular element and to move thereon to a position in which the engaged portion is in a plane substantially including the axes of said annular element and non-rotatable element for thereby moving said non-rotatable element into concentric relationship with said rotatable element, and means for operating said member to move said centering means into and out of said position.

12. A brake mechanism for a vehicle truck having wheels and a truck frame resiliently carried by said wheels, said mechanism comprising rotatable and non-rotatable annular friction braking elements arranged to frictionally interengage for braking one of said wheels, said rotatable element being secured to said wheel for rotation therewith, means carried by said frame for supporting said non-rotatable element and operative to permit movement of said non-rotatable element relative to said frame in a substantially vertical direction, an annular element secured in concentric relationship to one of said wheels, a member operatively connected to said non-rotatable element for movement vertically therewith and adapted to be moved relative to said non-rotatable element in a substantially horizontal direction, said member having a jaw adapted to be moved into substantial engagement with circumferentially spaced portions of said annular element for centralizing said non-rotatable element with said rotatable element, and means for moving said member into and out of engagement with said member.

13. A brake mechanism for a vehicle truck having wheels and a truck frame resiliently carried by said wheels, said mechanism comprising rotatable and non-rotatable annular friction braking elements arranged to frictionally interengage for braking one of said wheels, said rotatable element being secured to said wheel for rotation therewith, means carried by said frame for supporting said non-rotatable element and operative to permit movement of said non-rotatable element relative to said frame in a substantially vertical direction, an annular element secured in concentric relationship to one of said wheels, a member operatively connected to said non-rotatable element for movement vertically therewith and adapted to be moved in a substantially horizontal direction relative to said non-rotatable element, said member having two spaced arms, oppositely disposed centralizing means projecting inwardly from the ends of said arms and spaced apart a distance substantially equal to the diameter of said annular element, and means for moving said member to a position in which said centralizing means are in substantial engagement with substantially diametrically opposite top and bottom portions of said annular element for thereby centralizing said non-rotatable element with said rotatable element.

14. A brake mechanism for a vehicle truck having wheels and a truck frame resiliently carried by said wheels, said mechanism comprising rotatable and non-rotatable annular friction braking elements arranged to frictionally interengage for braking one of said wheels, said rotatable element being secured to said wheel for rotation therewith, means carried by said frame for supporting said non-rotatable element and operative to permit movement of said non-rotatable element relative to said frame in a substantially vertical direction, an annular element secured in concentric relationship to one of said wheels, a member operatively connected to said non-rotatable element for movement therewith in a vertical direction and adapted to be moved relatively to said non-rotatable element in a substantially horizontal direction, a pair of rollers carried by said member and spaced apart a distance substantially equal to the diameter of this annular element and each of said rollers being spaced substantially the same distance from the axis of said non-rotatable element, and means for moving said member relative to said non-rotatable element to a position where said rollers substantially engage substantially opposite top and bottom portions of said annular element for thereby centralizing said non-rotatable element with said rotatable element, and means for moving said member and thereby said rollers to a position out of engagement with said annular element.

15. A brake mechanism for a vehicle truck having wheels and a frame resiliently carried by said wheels, said mechanism comprising an annular rotatable friction braking element secured to rotate with one of said wheels, an annular non-rotatable friction braking element, means for moving said elements into frictional engagement for braking said wheel, a member having one end pivotally connected to said non-rotatable element, means carried by said frame pivotally connected to and supporting the other end of said member, means carried by said truck frame for supporting said non-rotatable element and the connected end of said member and operative to permit movement of said non-rotatable element relative to said frame in a substantially vertical direction, a circular element associated concentrically with one of said wheels, a centralizing element associated with said member and cooperative with said circular element to move said non-rotatable element into concentric relationship with said rotatable element, and a fluid pressure control piston carried by said member and operatively connected to said centralizing element for controlling movement of said centralizing element into and out of cooperative relationship with said circular element.

16. A brake mechanism for a vehicle truck having wheels and a frame resiliently carried by said wheels, said mechanism comprising an annular rotatable friction braking element secured to rotate with one of said wheels, an annular non-rotatable friction braking element, means for moving said elements into frictional engagement for braking said wheel, a member having one end pivotally connected to spaced portions of said non-rotatable element, means carried by said truck frame pivotally connected to and supporting the other end of said member, means carried by said truck frame for supporting said non-rotatable element and the connected end of said member and operative to permit movement of said non-rotatable element relative to said frame in a substantially vertical direction, a circular element associated concentrically with one of said wheels, a yoke carried by said member at one side of said circular element and slidable in a substantially horizontal direction, means in the ends of said yoke spaced apart a distance substantially equal to the diameter of said circular element and adapted to be moved into substantial engagement with substantially top or bottom portions of said circular element for moving said member and thereby said non-rotatable element relative to said rotatable element and into concentric relationship with said rotatable element, and a fluid pressure controlled piston carried by said member and operatively connected to said yoke for controlling movement of the means in the ends of said yoke into and out of engagement with said circular element.

17. A brake mechanism for a vehicle truck having wheels and a frame resiliently carried by said wheels, said mechanism comprising an annular rotatable friction braking element secured to one of said wheels for rotation therewith, an annular non-rotatable friction braking element, a brake cylinder secured to said frame, a brake cylinder lever connected at one end to said brake cylinder and at the opposite end to said non-rotatable element, resilient means carried by said frame for supporting said non-rotatable element and the adjacent portion of said lever and being adapted to permit movement of said non-rotatable element relative to said frame in a substantially vertical direction, an annular element secured in concentric relation with one of said wheels, a centralizing member carried by said lever and adapted to engage said annular element and operative upon such engagement to move said non-rotatable element relative to and into substantial concentric relationship with said rotatable element, and a fluid pressure operative cylinder device carried by said lever for controlling movement of said centralizing member into and out of engagement with said annular element, said brake cylinder device being operative to control movement of said rotatable and non-rotatable element into and out of frictional braking engagement with said rotatable element.

18. A brake mechanism for a vehicle truck having wheels and a frame resiliently carried by said wheels, said mechanism comprising an annular rotatable friction braking element secured to one of said wheels for rotation therewith, an annular non-rotatable friction braking element, a brake cylinder secured to said frame, a brake cylinder lever connected at one end to said brake cylinder and at the opposite end to said non-rotatable element, resilient means carried by said frame for supporting said non-rotatable element and the adjacent portion of said lever and being adapted to permit movement of said non-rotatable element relative to said frame in a substantially vertical direction, an annular element secured in concentric relation with one of said wheels, a centralizing member carried by said lever and adapted to engage said annular element and operative upon such engagement to move said non-rotatable element relative to and into substantial concentric relationship with said rotatable element, a centralizing cylinder operatively connected to said centralizing member and adapted to be operated by fluid under pressure to move said centralizing member into engagement with said annular element, said brake cylinder device being adapted to be operative by fluid under pressure to move said non-rotatable element into frictional braking engagement with said rotatable element, and means controlled by the pressure of fluid supplied for effecting operation of said centralizing cylinder device for delaying the supply of fluid under pressure to said brake cylinder device until after said non-rotatable element is moved into substantial concentric relationship with said rotatable element.

19. A brake mechanism for a vehicle truck having wheels and a frame resiliently carried by said wheels, said mechanism comprising an annular sleeve secured to one of said wheels in concentric relation therewith, an annular rotatable friction braking element secured to said sleeve in concentric relation with said sleeve and rotatable with said wheel, an annular non-rotatable friction braking element adapted to frictionally engage said rotatable element for braking said wheel and capable of movement vertically relative to said rotatable element, a member pivotally connected at one end to said non-rotatable element, means secured to said frame supporting the other end of said member, an element slidably mounted in said member and adapted to be moved into engagement with one side of said sleeve and then movable relative to said sleeve to a position engaging substantially opposite top and bottom portions of said sleeve for effecting movement of said non-rotatable element relative to said rotatable element into concentric relationship with said rotatable element, and a fluid pressure operative cylinder carried by said member for effecting movement of the slidable element into and out of engagement with said sleeve.

20. A brake mechanism for a vehicle truck having wheels and a frame resiliently carried by said wheels, said mechanism comprising an annular sleeve secured to one of said wheels in concentric relation therewith, an annular rotatable friction braking element secured to said sleeve in concentric relation with said sleeve and rotatable with said wheel, an annular non-rotatable friction braking element disposed at each of the opposite sides of said rotatable element and capable of movement vertically relative to said rotatable element, a brake cylinder device secured to and movable with said frame and comprising a casing, a rod and a fluid pressure operated piston for operating said rod, a rigid element pivotally connected at one end to said casing and at the opposite end to spaced portions of one of said non-rotatable elements, another rigid element pivotally connected at one end to said rod and at the opposite end to spaced portions of the other of said non-rotatable elements, resilient means carried by said frame for supporting said non-rotatable elements and the connected ends of said rigid elements, a yoke carried by each of said rigid elements and slidable therein in a substantially horizontal direction towards and away from said sleeve and having portions spaced apart a distance substantially equal to the diameter of the sleeve and adapted to engage substantially opposite top and bottom portions of said sleeve for moving said non-rotatable elements into concentric relation with said rotatable element, a fluid pressure operated cylinder carried by each of said rigid elements for controlling movement of the respective yoke into and out of engagement with said sleeve, said brake cylinder device being adapted to be operated by fluid under pressure to operate said rigid elements to move said non-rotatable elements into frictional braking engagement with said rotatable element, said rigid elements also being operative to hold said non-rotatable elements against turning with said rotatable element.

21. A brake cylinder device for controlling the operation of a brake lever having a ball like portion at one end, said brake cylinder device comprising a casing, a piston slidably mounted in said casing, a rod operatively connected to said piston, and a rigid bracket projecting from said casing and having an opening in which the end of said rod is slidably mounted for support, said rod having between said piston and bracket a socket for the reception of the ball like end of said lever to provide a ball and socket connection between said rod and lever.

22. A brake cylinder device for controlling the operation of a brake lever having a ball like portion at one end, said brake cylinder device comprising a casing, a piston slidably mounted in said casing, a rod operatively connected to said piston, and a rigid bracket projecting from said casing and having an opening in which the end of said rod is slidably mounted for support, said rod comprising two sections rigidly secured together in spaced relation between said piston and bracket and cooperating to form a socket in which the ball end of said lever is disposed.

23. A brake cylinder device for controlling the operation of a pair of brake levers each of which is provided at one end with a ball like portion, said brake cylinder device comprising a casing, a pressure head secured to one end of said casing, a non-pressure head secured to the opposite end of said casing, a piston slidably mounted in said casing, a rod operatively connected to said piston, and a rigid bracket projecting from said casing and having an opening in which the end of said rod is slidably mounted for support, and means secured to said pressure head and cooperative with a portion thereof to form a socket to receive the ball end of one of said levers, said rod having between said piston and bracket a socket for the reception of the ball like end of the other lever.

24. In a vehicle brake for a wheel and axle assembly of a railway vehicle truck, in combination, a substantially rigid structure independent of said axle interposed between and secured to said wheels and rotatable with said wheel, one or more rotatable friction elements secured to and rotatable with said structure, one or more non-rotatable friction elements adapted to be moved into frictional engagement with said rotatable elements, means for supporting said non-rotatable elements in cooperative relation with said rotatable elements, and means for effecting movement of said non-rotatable elements into and out of frictional engagement with said rotatable elements.

25. In a vehicle brake for a pair of wheels of a vehicle truck, in combination, a substantially rigid structure interposed between and secured to the inner faces of said wheels, the connection between said structure and wheels being closer to the periphery than to the axes of said wheels, one or more rotatable friction elements secured to and rotatable with said structure, one or more non-rotatable friction elements adapted to be moved into frictional engagement with said rotatable elements, means for supporting said non-rotatable elements in cooperative relation with said rotatable elements, and means for effecting movement of said non-rotatable elements into and out of frictional engagement with said rotatable elements.

26. In a vehicle brake for a wheel and axle assembly of a railway vehicle truck, in combination, a rigid structure independent of said axle disposed between and secured to said wheels between the peripheries thereof and the axle connections therewith and rotatable with said assembly, annular rotatable friction elements disposed between said wheels and encircling said structure and secured to said structure for rotation therewith, annular non-rotatable friction elements adapted to be moved into frictional braking engagement with said rotatable elements for braking same, means supporting said non-rotatable elements in cooperative relation with said rotatable elements, and means for moving said non-rotatable elements into and out of braking engagement with said rotatable elements.

27. In a vehicle brake for a pair of wheels secured to an axle in spaced relation, in combination, a substantially rigid structure disposed between and secured to the inner faces of said wheels and spaced from said axle, annular rotatable friction elements for braking said wheels carried by said structure and rotatable therewith and encircling said axle, annular non-rotatable friction elements encircling said structure and adapted to frictionally engage said rotatable elements for braking same, means supporting said non-rotatable elements in cooperative relation with said rotatable elements, and means for moving said non-rotatable elements into and out of braking engagement with said rotatable elements.

28. A brake mechanism for a vehicle truck having a pair of oppositely disposed spaced wheels, said mechanism comprising a tube disposed between said wheels in concentric relationship therewith and having outwardly flared ends rigidly secured to said wheels, an annular rotatable friction braking element encircling and secured to said tube in concentric relationship therewith for rotation with said wheels, an annular non-rotatable friction braking element encircling said tube, means for supporting said non-rotatable element in braking relationship with said rotatable element, and means for urging said non-rotatable element into frictional braking engagement with said rotatable element.

29. A brake mechanism for a vehicle truck having wheels and a frame resiliently supported upon said wheels, said mechanism comprising an annular rotatable friction braking element secured to one of said wheels for rotation therewith, an annular non-rotatable friction braking element adapted to be moved axially into frictional braking engagement with said rotatable element to effect braking of said wheel, means for normally supporting said non-rotatable element from said frame for movement therewith and operative to render said non-rotatable element movable vertically relative to said frame into concentric braking relation with said rotatable element, and fluid pressure operative means for controlling said axial and vertical movement of said non-rotatable element and operative in effecting braking of said wheel to effect first said vertical movement and then said axial movement.

30. In a vehicle brake for a pair of wheels secured to an axle in spaced relation, in combination, a substantially rigid structure disposed between and secured to said wheels and spaced from said axle, annular rotatable friction elements for braking said wheels carried by said structure and rotatable therewith and encircling said axle, annular non-rotatable friction elements encircling said structure and adapted to frictionally engage said rotatable elements for braking same, means supporting said non-rotatable elements in cooperative relation with said rotatable elements, and means for moving said non-rotatable elements into and out of braking engagement with said rotatable elements.

31. In a brake mechanism for a pair of laterally spaced wheels of a wheel and axle assembly of a railway vehicle truck, rotatable brake elements and non-rotatable brake elements encircling said axle between said wheels and adapted to be moved into and out of frictional braking engagement with each other, a rotatable structure independent of said axle interposed between and secured to said wheels for supporting said rotatable brake elements, a non-rotatable structure cooperative with said rotatable structure for supporting said non-rotatable elements in cooperative relation with said rotatable elements, and fluid pressure brake cylinder controlled means carried by non-rotatable structure for actuating said brake elements.

CLYDE C. FARMER.